(12) United States Patent
Imai

(10) Patent No.: US 8,098,033 B2
(45) Date of Patent: Jan. 17, 2012

(54) MOTOR DRIVE CIRCUIT

(75) Inventor: Toshiyuki Imai, Oizumi-machi (JP)

(73) Assignees: Semiconductor Components Industries, LLC, Phoenix, AZ (US); Sanyo Semiconductor Co., Ltd., Gunma (JP)

(*) Notice: Subject to any disclaimer, the term of this patent is extended or adjusted under 35 U.S.C. 154(b) by 391 days.

(21) Appl. No.: 12/412,285

(22) Filed: Mar. 26, 2009

(65) Prior Publication Data

US 2009/0243534 A1 Oct. 1, 2009

(30) Foreign Application Priority Data

Mar. 27, 2008 (JP) .................................. 2008-084213

(51) Int. Cl.
*H03K 5/00* (2006.01)
(52) U.S. Cl. ................. 318/400.2; 318/400.29; 318/254
(58) Field of Classification Search ............... 318/400.2, 318/400.29, 254, 471, 599, 362; 388/811
See application file for complete search history.

(56) References Cited

U.S. PATENT DOCUMENTS

| | | | | |
|---|---|---|---|---|
| 5,162,709 A * | 11/1992 | Ohi | ........................ | 318/400.2 |
| 5,703,473 A * | 12/1997 | Phillips et al. | ................. | 323/282 |
| 6,433,502 B2 * | 8/2002 | Oku | .............. | 318/599 |
| 6,504,334 B2 * | 1/2003 | Sogawa | .......... | 318/599 |
| 7,038,415 B2 * | 5/2006 | Nakamura et al. | ............. | 318/471 |
| 7,509,032 B2 * | 3/2009 | Jami | .............. | 388/811 |
| 7,622,873 B2 * | 11/2009 | Takata et al. | .................. | 318/362 |
| 7,750,731 B2 * | 7/2010 | Poulsen et al. | .................. | 330/10 |
| 7,755,312 B2 * | 7/2010 | Hirata | ....................... | 318/400.29 |
| 7,759,889 B2 * | 7/2010 | Hirata | ....................... | 318/400.29 |
| 2001/0030525 A1 * | 10/2001 | Sogawa | .......... | 318/599 |
| 2004/0178759 A1 * | 9/2004 | Nakamura et al. | ............. | 318/471 |
| 2005/0162223 A1 * | 7/2005 | Maejima | ......................... | 330/10 |
| 2005/0163237 A1 * | 7/2005 | Katanaya | ....................... | 375/260 |
| 2005/0212501 A1 * | 9/2005 | Acatrinei | ....................... | 323/283 |
| 2006/0197480 A1 * | 9/2006 | Mori et al. | ....................... | 318/254 |
| 2008/0018295 A1 * | 1/2008 | Jami | .............................. | 318/799 |
| 2008/0100652 A1 * | 5/2008 | Oshima et al. | ................... | 347/10 |
| 2008/0218545 A1 * | 9/2008 | Oshima et al. | ................... | 347/10 |
| 2008/0219649 A1 * | 9/2008 | Hirata | ........................ | 388/811 |
| 2009/0049463 A1 * | 2/2009 | Ueda | .............................. | 720/695 |
| 2009/0224602 A1 * | 9/2009 | Tsukamoto | ....................... | 307/31 |
| 2009/0261764 A1 * | 10/2009 | Hirata | ....................... | 318/400.29 |

FOREIGN PATENT DOCUMENTS

JP 2001-320890 11/2001

* cited by examiner

*Primary Examiner* — Paul Ip
(74) *Attorney, Agent, or Firm* — SoCal IP Law Group LLP; Steven C. Sereboff; John E. Gunther

(57) ABSTRACT

A motor drive circuit comprising: a triangle wave generation circuit configured to charge/discharge a capacitor with a charging/discharging current having a current amount corresponding to an amplitude control voltage for controlling an amplitude of an oscillation voltage that varies in a triangle wave shape, and to output a charging voltage of the capacitor as the oscillation voltage; a pulse signal generation circuit configured to generate a pulse signal having a duty ratio corresponding to a level of a speed control voltage for controlling a rotational speed of a motor, based on a comparison result between the speed control voltage and the oscillation voltage output from the triangle wave generation circuit; and a drive circuit configured to intermittently drive a motor coil based on the pulse signal.

5 Claims, 6 Drawing Sheets

MOTOR DRIVE CIRCUIT

CROSS-REFERENCE TO RELATED APPLICATION

This application claims the benefit of priority to Japanese Patent Application No. 2008-084213, filed Mar. 27, 2008, of which full contents are incorporated herein by reference.

BACKGROUND OF THE INVENTION

1. Field of the Invention

The present invention relates to a motor drive circuit.

2. Description of the Related Art

In a motor drive circuit that controls the rotation of a motor, a motor coil is intermittently driven using a pulse signal so that the rotational speed of the motor may be adjusted. For example, there is a case where a pulse signal having a duty ratio according to a level of a control voltage is obtained by comparing a speed control voltage of a direct current input from a microcomputer, etc., with an oscillation voltage that varies in a triangle wave shape, and a motor coil is intermittently driven using the generated pulse signal (see, e.g., Japanese Patent Application Laid-open Publication No. 2001-320890).

Here, since the variation range of the speed control voltage may vary with specifications of the microcomputer, etc., there is a case where the variation range of the oscillation voltage can be set according to the variation range of the speed control voltage. In general, the oscillation voltage is generated by the following operation in a repetitive manner: charging a capacitor with a constant current; and thereafter starting discharging the capacitor with a constant current when the charging voltage of the capacitor reaches an upper limit level; and thereafter starting charging the capacitor with a constant current when the charging voltage of the capacitor reaches a lower limit level. For example, as illustrated in FIG. 6, when setting the upper limit level at V1 and the lower limit level at V2, an oscillation voltage Vosc1 is obtained which is indicated by a broken line; and when setting the upper limit level at V1 and the lower limit level at V3, an oscillation voltage Vosc2 is obtained which is indicated by a solid line. In other words, when setting the variation range of the speed control voltage Vd in the range of V1 to V2, the oscillation voltage Vosc1 is generated; and when setting the variation range of the speed control voltage Vd is set in the range of V1 to V3, the oscillation voltage Vosc2 is generated.

However, in a case where the variation range of the oscillation voltage, i.e., the amplitude of the oscillation voltage, is changed, assuming that the rate of change in oscillation voltage during charge/discharge is the same regardless of amplitude, the frequency of the oscillation voltage changes according to the amplitude. In an example of FIG. 6, assuming that V2=(V1+V3)/2, the frequency of the oscillation voltage Vosc1 is twice the frequency of the oscillation voltage Vosc2. Accordingly, the frequency of a pulse signal PWM1 obtained by comparing the oscillation voltage Vosc1 with the speed control voltage Vd is twice the frequency of a pulse signal PWM2 obtained by comparing the oscillation voltage Vosc2 with the speed control voltage Vd. Under circumstances where the duty ratio of the pulse signal thus changes according to the amplitude of the oscillation voltage, noise may occur when the motor is intermittently driven and the pulse signal may have a frequency incapable of driving the motor, due to frequencies of the pulse signal entering an audible region.

SUMMARY OF THE INVENTION

A motor drive circuit according to an aspect of the present invention, comprises: a triangle wave generation circuit configured to charge/discharge a capacitor with a charging/discharging current having a current amount according to an amplitude control voltage for controlling an amplitude of an oscillation voltage that varies in a triangle wave shape, and to output a charging voltage of the capacitor as the oscillation voltage; a pulse signal generation circuit configured to generate a pulse signal having a duty ratio corresponding to a level of a speed control voltage for controlling a rotational speed of a motor, based on a comparison result between the speed control voltage and the oscillation voltage output from the triangle wave generation circuit; and a drive circuit configured to intermittently drive a motor coil based on the pulse signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
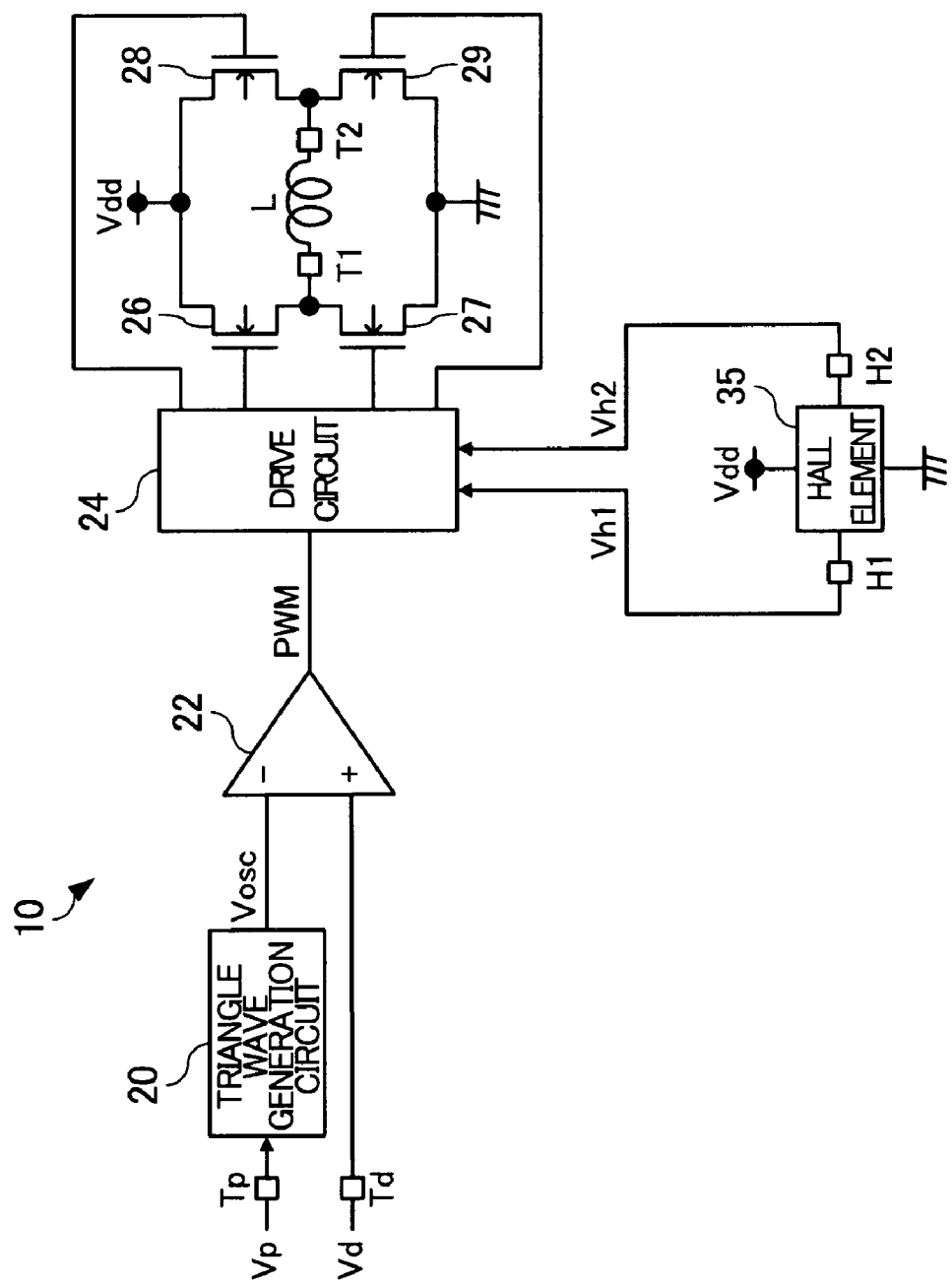
FIG. 1 illustrates a configuration of a motor drive circuit according to an embodiment of the present invention.

FIG. 1 illustrates a configuration of a motor drive circuit according to an embodiment of the present invention. A motor drive circuit 10 is included in a fan motor for cooling a heating part such as a processor (device to be cooled) in electronic equipment such as a notebook computer, and is used for driving a motor for rotating a fan for cooling, for example.

The motor drive circuit 10 according to an embodiment of the present invention is a circuit that drives a single-phase fan motor, includes a triangle wave generation circuit 20, a comparator 22, a drive circuit 24, and N-channel MOSFETs 26 to 29, and can control the rotational speed of the motor by adjusting the drive frequency of a motor coil L corresponding to the level of a control voltage Vd that is input from a microcomputer, etc. A Hall element 35 is connected to the motor drive circuit 10 via terminals H1 and H2 and outputs signals Vh1 and Vh2 in a reversed-phase relationship which change sinusoidally corresponding to the rotational position of the motor.

The triangle wave generation circuit 20 generates an oscillation voltage Vosc that has an amplitude corresponding to an amplitude control voltage Vp to be applied thereto via a terminal Tp and that varies in a triangle wave shape at a predetermined frequency.

The comparator 22 (pulse signal generation circuit) compares the oscillation voltage Vosc and a speed control voltage Vd for controlling the rotational speed of the motor, which is applied thereto via a terminal Td, to output a pulse signal PWM having a duty ratio corresponding to the level of the speed control voltage Vd. In an embodiment according to the present invention, the pulse signal PWM is at the H level when the speed control voltage Vd is higher than the oscillation voltage Vosc; and the pulse signal PWM is at the L level when the speed control voltage Vd is lower than the oscillation voltage Vosc. Accordingly, a duty ratio of the H level of the pulse signal PWM changes from 0% to 100% as the speed control voltage Vd changes from the lower limit to the upper limit of the oscillation voltage Vosc.

The drive circuit 24 appropriately switches the N-channel MOSFETs 26 to 29 ON and OFF corresponding to the rotational position of the motor so that the motor is rotated in a desired direction based on the signals Vh1 and Vh2 from the Hall element 35. For example, the drive circuit 24 switches the N-channel MOSFETs 26 and 29 ON and the N-channel MOSFETs 27 and 28 OFF, so that a current flows through the motor coil L in a direction from a terminal T1 to a terminal T2. On the other hand, for example, the drive circuit 24 switches the N-channel MOSFETs 27 and 28 ON and the N-channel MOSFETs 26 and 29 OFF, so that a current flows through the motor coil L in a direction from the terminal T2 to the terminal T1.

The drive circuit 24 can intermittently drive the motor coil L based on the pulse signal PWM. For example, in a case where the N-channel MOSFETs 26 and 29 are switched ON and the N-channel MOSFETs 27 and 28 are switched OFF, the drive circuit 24 can switch the N-channel MOSFET 26 ON for a period during which the pulse signal PWM is at the H level and can switch the N-channel MOSFET 26 OFF for a period during which the pulse signal PWM is at the L level. In other words, the motor coil L is intermittently driven corresponding to the duty ratio of the pulse signal PWM, and the rotational speed of the motor also corresponds to the duty ratio of the pulse signal PWM.

Figure 2:
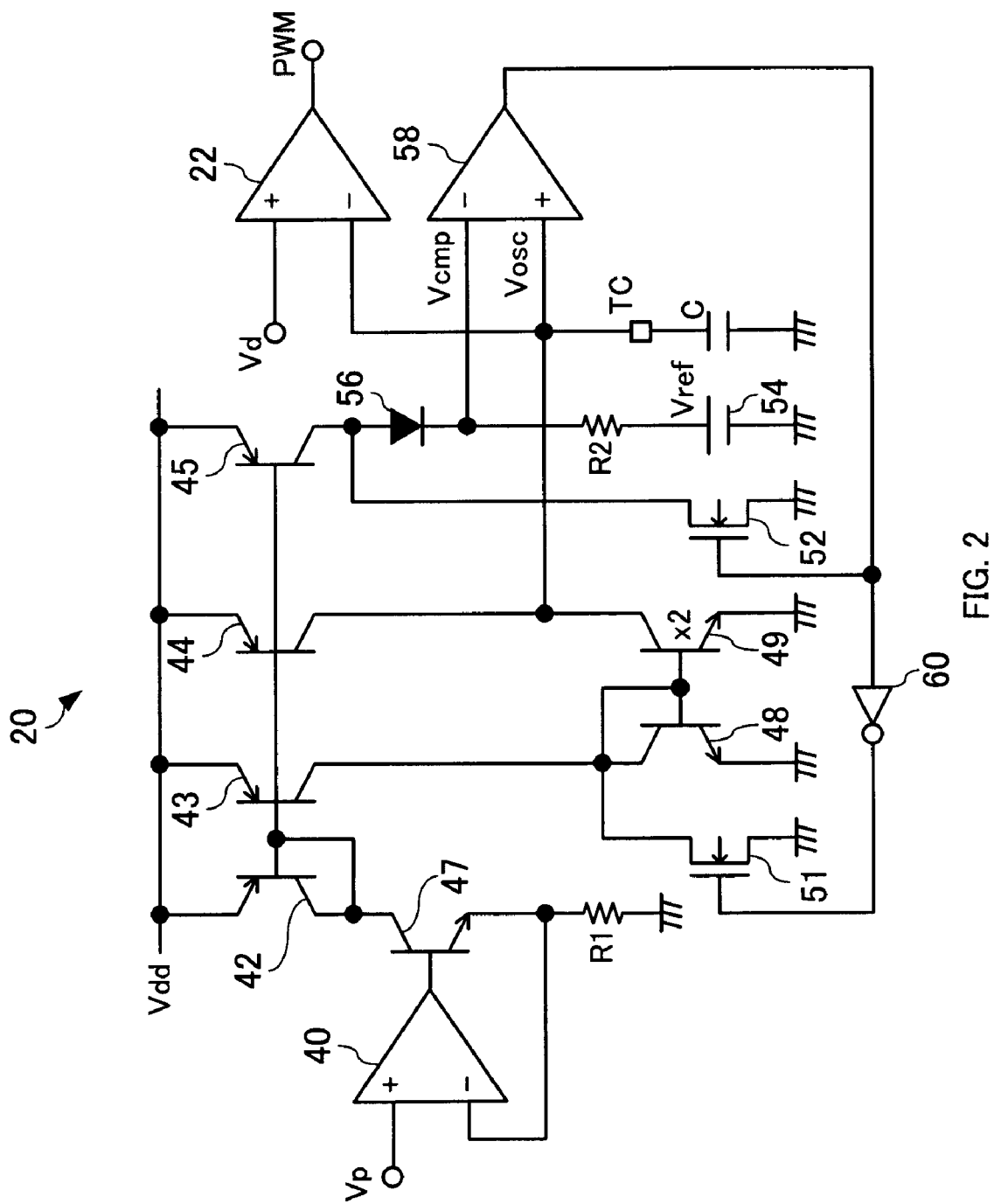
FIG. 2 illustrates a configuration example of a triangle wave generation circuit.

FIG. 2 illustrates a configuration example of the triangle wave generation circuit 20. The triangle wave generation circuit 20 includes an operational amplifier 40, PNP transistors 42 to 45, NPN transistors 47 to 49, an N-channel MOSFET 51, and an N-channel MOSFET 52 (switch circuit); a reference power supply 54, a diode 56, and a comparator 58 (comparison circuit); and an inverter 60, a resistor R1, and a resistor R2 (voltage generation circuit).

The operational amplifier 40 controls the NPN transistor 47 such that a voltage at the emitter of the NPN transistor 47 becomes equal to the amplitude control voltage Vp. Thus, a current of Vp/R1 flows through the PNP transistor 42, the NPN transistor 47, and the resistor R1, where R1 is a resistance value of the resistor R1. The PNP transistors 42 to 45 are constituents of a current mirror circuit, and are of the same size; and a current of Vp/R1 flows in the PNP transistors 43 to 45 as well. In other words, a circuit including the operational amplifier 40, the NPN transistor 47, the resistor R1, and the PNP transistors 42 to 45 corresponds to a current generation circuit.

NPN transistors 48 and 49 are constituents of a current mirror circuit, and are of a size ratio of 1:2. Then, the collector of the NPN transistor 48 is connected to the collector of the PNP transistor 43 and to the drain of the N-channel MOSFET 51; and the collector of the NPN transistor 49 is connected to the collector of the PNP transistor 44 and to a capacitor C via a terminal TC. Accordingly, when the N-channel MOSFET 51 is ON, the current of Vp/R1 output from the PNP transistor 44 flows into the capacitor C, so that the capacitor C is charged; and when the N-channel MOSFET 51 is OFF, since it is necessary to pass a current of 2×Vp/R1 through the NPN transistor 49, a current of Vp/R1 flows from the capacitor C to the NPN transistor 49, so that the capacitor C is discharged. Then, the charging voltage of the capacitor C becomes the oscillation voltage Vosc. A circuit including the NPN transistors 48 and 49 and the N-channel MOSFET 51 corresponds to a charging/discharging circuit.

A reference voltage Vref, which is output from the reference power supply 54, is applied to one end of the resistor R2; and the other end of the resistor R2 is connected to the cathode of the diode 56. The anode of the diode 56 is connected to the collector of the PNP transistor 45 and to the drain of the N-channel MOSFET 52. Accordingly, when the N-channel MOSFET 52 is ON, a current does not flow through resistor R2; and when the N-channel MOSFET 52 is OFF, a current of Vp/R1 flows through the resistor R2. That is, a comparison voltage Vcmp, which is generated at a connection point between the diode 56 and the resistor R2, is Vref (first level) when the N-channel MOSFET 52 is ON, and the comparison voltage Vcmp is Vref+(R2/R1)Vp (second level) when the N-channel MOSFET 52 is OFF, where R2 is a resistance value of the resistor R2. A circuit including the N-channel MOSFET 52, the reference power supply 54, the diode 56, and the resistor R2 corresponds to a comparison voltage control circuit. A circuit including the N-channel MOSFET 52 and the diode 56 corresponds to a comparison voltage output circuit.

Figure 3:
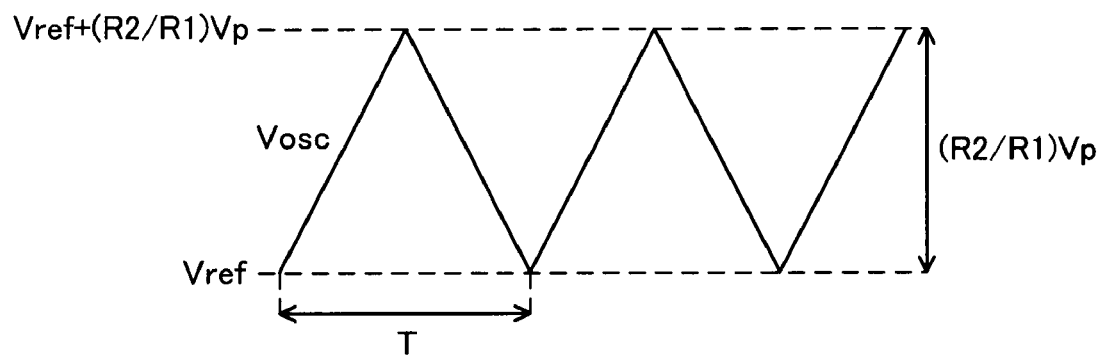
FIG. 3 is a waveform diagram illustrating an example of an operation of a triangle wave generation circuit.

FIG. 3 is a waveform diagram illustrating an example of an operation of the triangle wave generation circuit 20. In an initial state, it is assumed that an output signal of the comparator 58 is at the L level. At this time, the N-channel MOSFET 52 is OFF, and therefore, the comparison voltage Vcmp is Vref+(R2/R1)Vp. Then, an output signal of the comparator 58 is inverted by the inverter 60 to be changed to the H level, and therefore, the N-channel MOSFET 51 is ON, and the capacitor C is charged by a current of Vp/R1.

When the capacitor C is charged so that the oscillation voltage Vosc reaches Vref+(R2/R1)Vp, the output signal of the comparator 58 is changed to the H level. Thus, the N-channel MOSFET 52 is switched ON and the comparison voltage Vcmp is changed to Vref, and the N-channel MOSFET 51 is switched OFF and the capacitor C is discharged with a current of Vp/R1.

When the capacitor C is discharged so that the oscillation voltage Vosc reaches Vref, the output signal of the comparator 58 is changed to the L level, and the capacitor C starts being recharged. Thus, the capacitor C is charged/discharged with a current of Vp/R1, so that the oscillation voltage Vosc oscillates with a lower limit of Vref and an upper limit of Vref+(R2/R1)Vp. That is, an amplitude of the oscillation voltage Vosc is (R2/R1)Vp and changes according to the amplitude control voltage Vp.

Here, an equation can be expressed by T=CV/I={C1×2(R2/R1)Vp}/(Vp/R1)=2C1×R2, where T represents a period of the oscillation voltage Vosc and C1 represents capacitance of the capacitor C. Accordingly, the period of the oscillation voltage Vosc is constant. That is, the oscillation voltage Vosc has a constant frequency regardless of amplitude.

Figure 4:
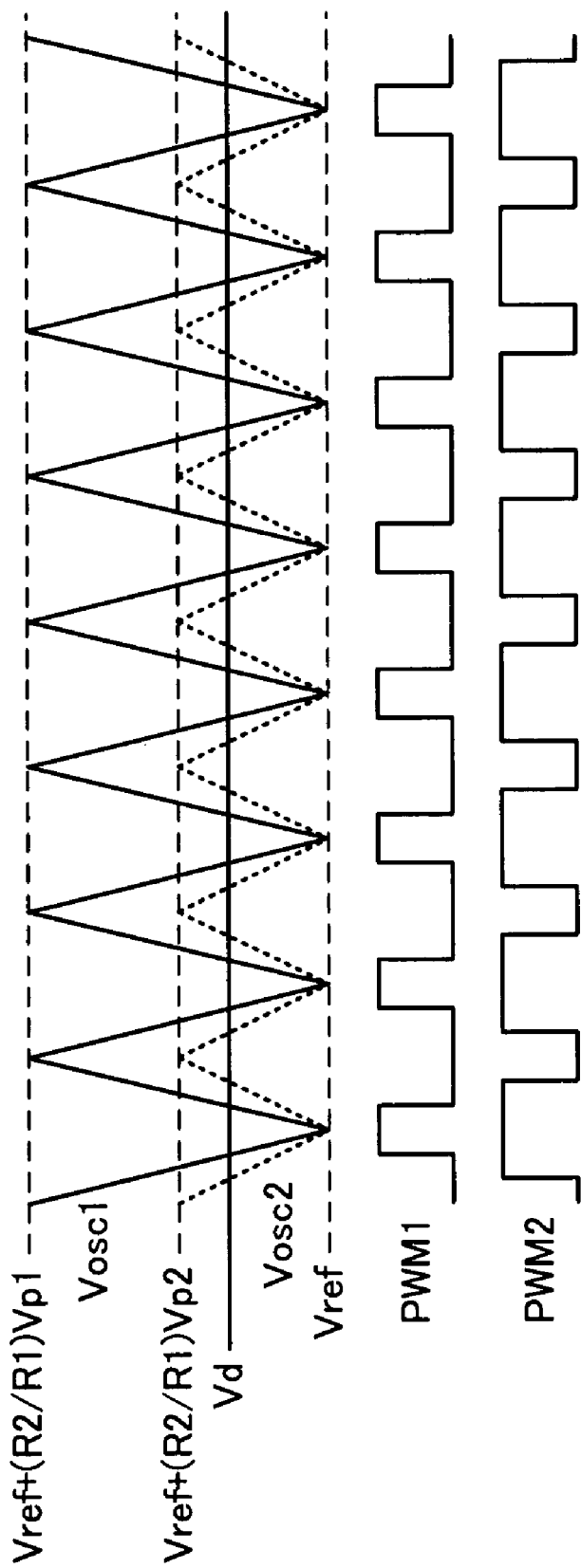
FIG. 4 is a waveform diagram illustrating an example of pulse signals when an oscillation voltage varies in amplitude.

FIG. 4 illustrates an example of pulse signals PWM when the amplitude of the oscillation voltage Vosc is changed. Vosc1 represents a waveform of the oscillation voltage Vosc when the amplitude control voltage Vp is set at Vp1, and Vosc2 is a waveform of the oscillation voltage Vosc when the amplitude control voltage Vp is set at Vp2 (=Vp1/2). Here, the amplitude of the oscillation voltage Vosc is (R2/R1)Vp, and thus, the amplitude of Vosc1 is twice the amplitude of Vosc2. However, the frequency of the oscillation voltage Vosc is constant regardless of amplitude, and therefore, the frequencies of the oscillation voltages Vosc1 and Vosc2 are the same. Accordingly, the frequencies of pulse signals PWM1 and PWM2 obtained by comparing the oscillation voltages Vosc1 with Vosc2 to the speed control voltage Vd also are the same regardless of amplitudes of the oscillation voltages Vosc1 and Vosc2.

Hereinabove, the motor drive circuit 10 according to an embodiment of the present invention is described. In the motor drive circuit 10, the capacitor C is charged/discharged with a charging/discharging current having a current amount (Vp/R1) according to the amplitude control voltage Vp. That is, the charging/discharging current also changes with the changes in amplitude of the oscillation voltage Vosc, and therefore, the oscillation voltage Vosc has a constant period regardless of amplitude. Accordingly, the pulse signal PWM has a constant frequency as well, and thus, the motor can be intermittently driven at a frequency that does not depend on the amplitude of the oscillation voltage Vosc. Therefore, it is possible to prevent occurrence of noise when the motor is intermittently driven and to prevent the pulse signal PWM from having a frequency with which the motor cannot be driven.

The triangle wave generation circuit 20 that generates such an oscillation voltage Vosc may include: as illustrated in FIG. 2, the current generation circuit that generates a charging/discharging current according to the amplitude control voltage Vp; the comparator 58 that compares the charging voltage of the capacitor and the comparison voltage Vcmp; the charging/discharging circuit that charges/discharges the capacitor C according to the output signal of the comparator 58, and the comparison voltage control circuit that controls the comparison voltage Vcmp according to the output signal of the comparator 58.

As illustrated in FIG. 2, the comparison voltage control circuit that controls the comparison voltage Vcmp may includes the reference power supply 54, the voltage generation circuit that outputs a voltage according to the charging/discharging current, and the comparison voltage output circuit that outputs the comparison voltage Vcmp according to the output signal of the comparator 58.

As illustrated in FIG. 2, the voltage generation circuit that outputs a voltage according to the charging/discharging current may be configured with the resistor R2. Furthermore, as illustrated in FIG. 2, the comparison voltage output circuit that outputs the comparison voltage Vcmp according to the output signal of the comparator 58 may includes the diode 56, in which the charging/discharging current flows to the anode thereof and the resistor R2 is connected to the cathode thereof, and the N-channel MOSFET 52 that controls the flow of the charging/discharging current to the resistor R2.

The above embodiments of the present invention are simply for facilitating the understanding of the present invention and are not in any way to be construed as limiting the present invention. The present invention may variously be changed or altered without departing from its spirit and encompass equivalents thereof.

For example, in an embodiment according to the present invention, the motor drive circuit 10 is a circuit for driving a single-phase fan motor, however, a motor to be driven is not limited to a fan motor, and the number of phases is not limited to a single phase, either.

Figure 5:
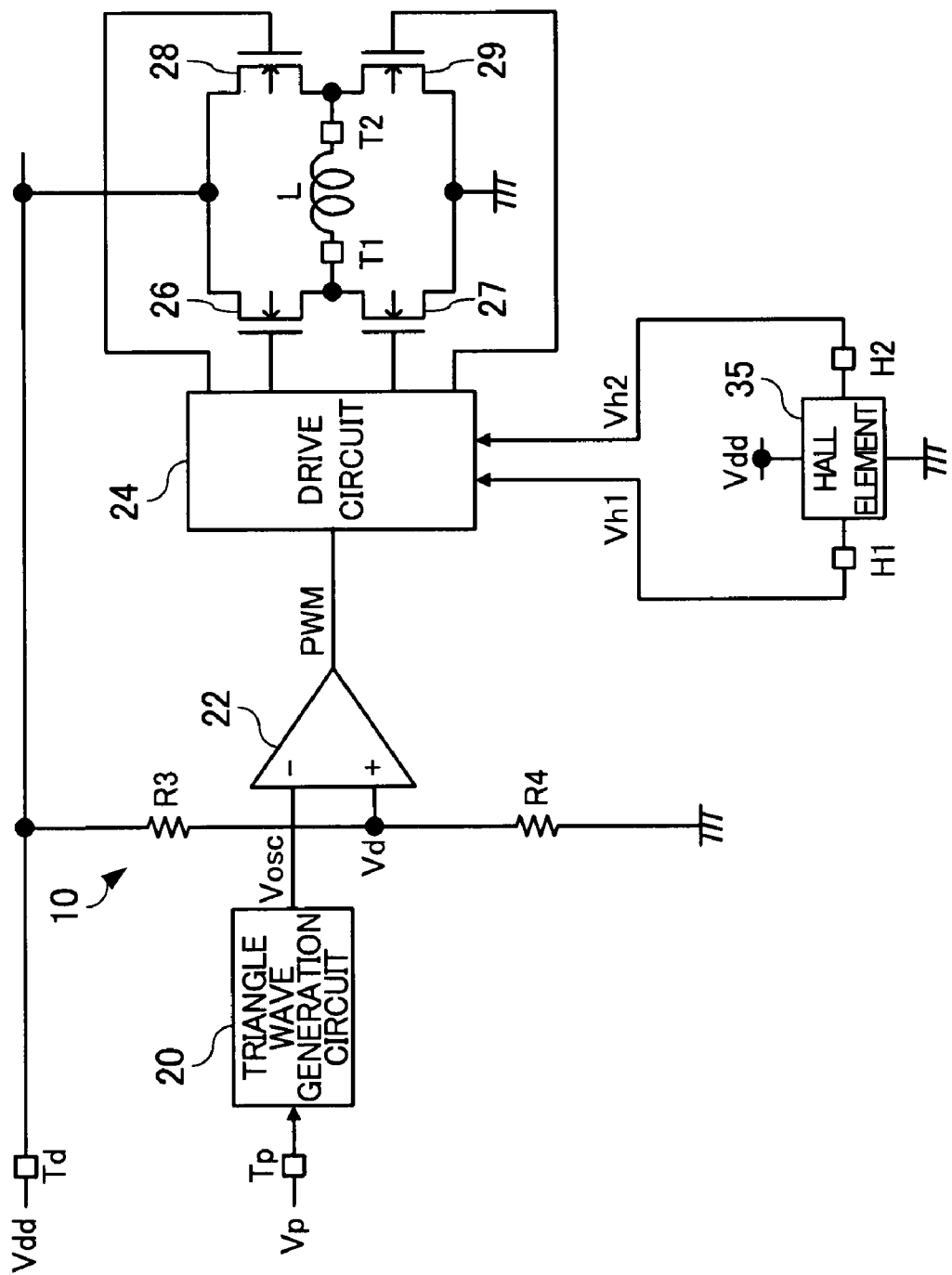
FIG. 5 illustrates an example where a drive voltage is linked with a speed control voltage.
Figure 6:
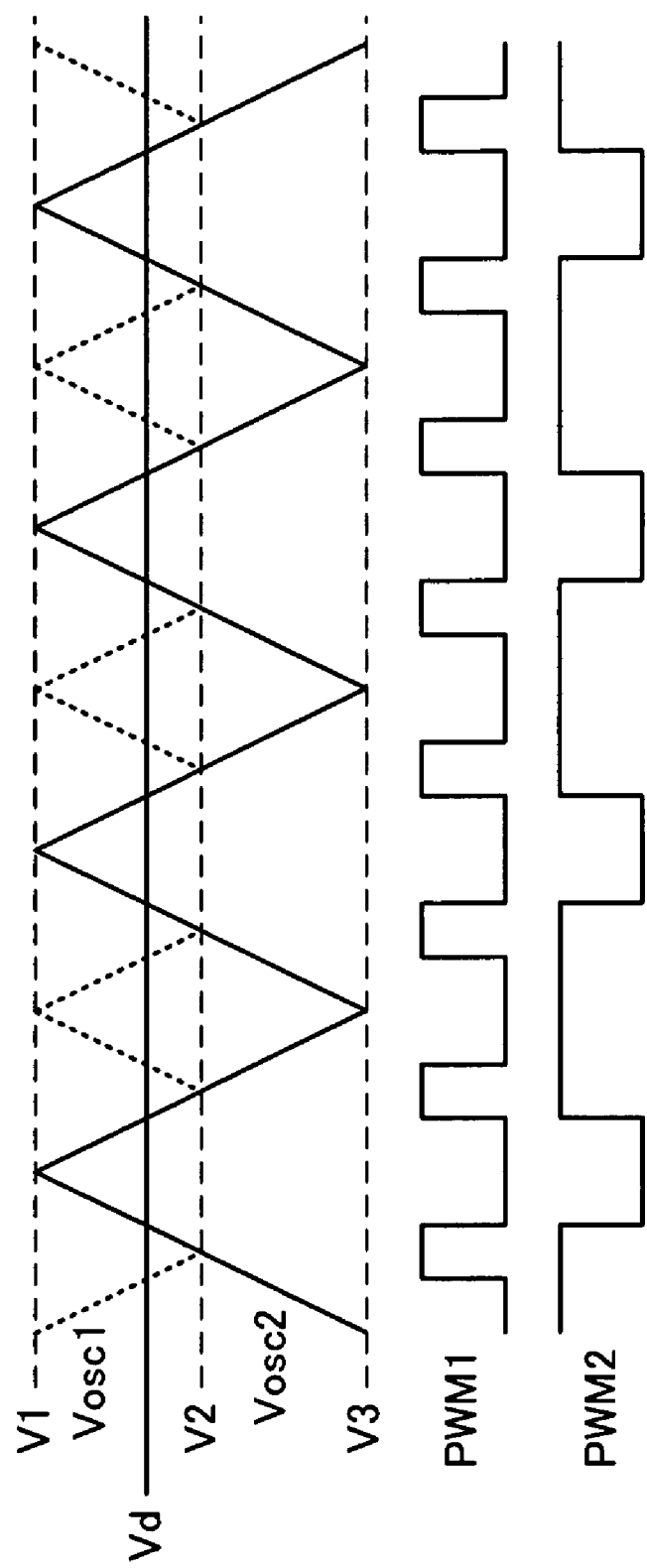
FIG. 6 illustrates an example of variations in pulse signals according to amplitude variation of an oscillation voltage.

In FIG. 1, a drive voltage Vdd of the motor coil L is at a fixed level, however, as illustrated in FIG. 5, the drive voltage Vdd may varies according to the target rotational speed of the motor under the control of a microcomputer, etc. Then, the speed control voltage Vd may be generated according to the drive voltage Vdd using, for example, resistors R3 and R4 (control voltage generation circuit). Thereby, the duty ratio of the pulse signal PWM changes according to the drive voltage Vdd, and thus, the control range of the rotational speed of the motor can be extended as compared to a case where only the drive voltage Vdd is controlled or a case where the drive voltage Vdd is fixed and only the duty ratio of the pulse signal PWM is controlled.

What is claimed is:

1. A motor drive circuit comprising:
a triangle wave generation circuit configured to alternately charge and discharge a capacitor with a charging/discharging current having a current amount corresponding to an amplitude control voltage for controlling an amplitude of an oscillation voltage that varies in a triangle wave shape, and to output a charging voltage of the capacitor as the oscillation voltage;
a pulse signal generation circuit configured to generate a pulse signal having a duty ratio corresponding to a level of a speed control voltage for controlling a rotational speed of a motor, based on a comparison result between the speed control voltage and the oscillation voltage output from the triangle wave generation circuit; and
a drive circuit configured to intermittently drive a motor coil based on the pulse signal.

2. The motor drive circuit according to claim 1, wherein the triangle wave generation circuit includes:
a current generation circuit configured to generate the charging/discharging current having the current amount corresponding to the amplitude control voltage;
a comparison circuit configured to output a comparison result between the charging voltage and a comparison voltage;
a charging/discharging circuit configured to discharge the capacitor with the charging/discharging current when the charging voltage is higher than the comparison voltage, and to charge the capacitor with the charging/discharging current when the charging voltage is lower than the comparison voltage, based on the comparison result; and
a comparison voltage control circuit configured to change the comparison voltage to a first level, when the charging voltage is higher than the comparison voltage, and change the comparison voltage to a second level higher than the first level by a difference corresponding to the amplitude control voltage, when the charging voltage is lower than the comparison voltage, based on the comparison result.

3. The motor drive circuit according to claim 2, wherein the comparison voltage control circuit includes:
a reference power supply configured to output a reference voltage of a predetermined level;
a voltage generation circuit configured to output a voltage corresponding to the charging/discharging current; and
a comparison voltage output circuit configured to output the reference voltage as the comparison voltage of the first level, when the charging voltage is higher than the comparison voltage, and output as the comparison voltage of the second level a voltage obtained by adding the voltage output from the voltage generation circuit to the reference voltage, when the charging voltage is lower than the comparison voltage, based on the comparison result.

4. The motor drive circuit according to claim 3, wherein the voltage generation circuit includes a resistor including one end connected to the reference power supply, and wherein the comparison voltage output circuit includes:

a diode including an anode for receiving the charging/discharging current and a cathode connected to the other end of the resistor; and a switch circuit including one end connected to the anode of the diode and the other end applied with a voltage lower than the reference voltage, the switch circuit being configured to be switched ON when the charging voltage is higher than the comparison voltage and switched OFF when the charging voltage is lower than the comparison voltage, based on the comparison result.

5. The motor drive circuit according to claim 1, further comprising a control voltage generation circuit configured to change the control voltage according to a drive voltage corresponding to a target rotational speed of the motor, the drive voltage being applied to the motor coil.

* * * * *